US009532172B1

(12) United States Patent
Gerken, III et al.

(10) Patent No.: US 9,532,172 B1
(45) Date of Patent: Dec. 27, 2016

(54) ZONE-BASED AWAY MESSAGES

(71) Applicant: International Business Machines Corporation, Armonk, NY (US)

(72) Inventors: John K. Gerken, III, Apex, NC (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/140,366

(22) Filed: Apr. 27, 2016

(51) Int. Cl.
*G06F 15/16* (2006.01)
*G06F 7/00* (2006.01)
*H04W 4/02* (2009.01)
*H04W 4/20* (2009.01)
*H04W 4/12* (2009.01)

(52) U.S. Cl.
CPC ............... *H04W 4/021* (2013.01); *H04W 4/12* (2013.01); *H04W 4/206* (2013.01)

(58) Field of Classification Search
CPC ...................................................... G05B 19/00
USPC ......................................................... 340/5.8
See application file for complete search history.

(56) References Cited

U.S. PATENT DOCUMENTS

| | | | |
|---|---|---|---|
| 7,334,021 B1 | 2/2008 | Fletcher | |
| 7,899,468 B2 * | 3/2011 | Lohtia | H04L 12/189 455/456.1 |
| 8,064,896 B2 * | 11/2011 | Bell | H04L 12/1859 370/312 |
| 8,121,073 B2 * | 2/2012 | Corrao | H04W 40/02 370/328 |
| 8,275,767 B2 | 9/2012 | Shepherd et al. | |
| 8,504,639 B2 * | 8/2013 | Cochard | H04W 40/12 709/208 |
| 8,799,361 B2 | 8/2014 | Ross et al. | |
| 9,191,388 B1 * | 11/2015 | Paczkowski | H04L 63/10 |
| 9,191,721 B2 * | 11/2015 | Holladay | H04N 21/43615 |
| 2004/0064566 A1 * | 4/2004 | Striemer | G06Q 30/0261 709/228 |
| 2007/0243880 A1 | 10/2007 | Gits et al. | |
| 2007/0265866 A1 | 11/2007 | Fehling et al. | |

(Continued)

OTHER PUBLICATIONS

Simple In/Out, "Simple In/Out API v3 Documentation", downloaded on Mar. 11, 2016 from https://www.simpleinout.com/api/docs#beacons-create-a-beacon, pp. 1-10, United States.

(Continued)

*Primary Examiner* — Fekadeselassie Girma
*Assistant Examiner* — John Mortell
(74) *Attorney, Agent, or Firm* — Sherman IP LLP; Kenneth L. Sherman; Hemavathy Perumal

(57) ABSTRACT

One embodiment provides a system for generating shopping incentives for users based on purchasing patterns of the users. The system performs operations including determining one or more zones within a venue based on wireless signals transmitted by one or more wireless sensors. The operations further include, for at least one zone, determining a current state associated with the zone, monitoring the zone, and, in response to detecting a device entering the zone, notifying the device of the current state associated with the zone. Each zone is assigned to a zone owner. A current state associated with a zone is based on a real-time location of a device carried by the zone owner.

1 Claim, 5 Drawing Sheets

(56) References Cited

U.S. PATENT DOCUMENTS

| | | | |
|---|---|---|---|
| 2009/0089158 A1* | 4/2009 | Noll | G06Q 30/0254 |
| | | | 705/14.52 |
| 2013/0006790 A1 | 1/2013 | Raskin et al. | |
| 2015/0072663 A1 | 3/2015 | Chande et al. | |
| 2015/0235161 A1* | 8/2015 | Azar | G06Q 10/063114 |
| | | | 705/7.15 |

OTHER PUBLICATIONS

Simple In/Out, "In/Out Board on your Phone", downloaded on Mar. 11, 2016 from https://www.simpleinout.com/phones, pp. 1-10, United States.

Smartthings, "Known mobile presence issues and FAQ", downloaded on Mar. 11, 2016 from https://support.smartthings.com/hc/en-us/articles/204744424, pp. 1-2, United States.

Smartthings, "My mobile presence isn't updating my status consistently", downloaded on Mar. 11, 2016 from https://support.smartthings.com/hc/en-us/articles/200865724-My-mobile-presence-isn-t-updating-my-status-consistently, pp. 1-2, United States.

Android Developers, "Creating and Monitoring Geofences", downloaded Mar. 11, 2016 from http://developer.android.com/training/location/geofencing.html, pp. 1-10, United States.

Donovan, J. "Indoor Mapping Startup Meridian Adds Notification Zones to Their Strategy", May 15, 2013, downloaded from http://techcrunch.com/2013/05/15/indoor-mapping-startup-meridian-adds-notification-zones-to-their-strategy/ on Apr. 15, 2016, pp. 1-7, TechCrunch, United States.

Stack Overflow, "How to change the shape of a Geofence," Aug. 2013, downloaded on Apr. 27, 2016 from http://stackoverflow.com/questions/18005648/how-to-change-the-shape-of-a-geofence, pp. 1, United States.

Stack Overflow, "Polygon geofencing with iOS", May 2014, downloaded on Apr. 27, 2016 from http://stackoverflow.com/questions/23789341/polygon-geofencing-with-ios, pp. 1-2, United States.

\* cited by examiner

ZONE-BASED AWAY MESSAGES

The present invention generally relates to location management systems, and more particularly, a location management system providing zone-based away messages.

BACKGROUND

Location based services utilize Bluetooth low energy (BLE) beacons and/or wireless fidelity (Wi-Fi) sensors to enhance user experience. BLE beacons and/or Wi-Fi sensors may be used for a wide range of use cases from sales promotions to building security. BLE beacons transmit wireless Bluetooth signals to Bluetooth enabled devices (e.g., smart phones) for use in awareness and promotion. For example, a BLE beacon can transmit a wireless Bluetooth signal to a Bluetooth enabled device to notify an application on the device that it is within the proximity of the beacon. Similarly, Wi-Fi sensors transmit wireless Wi-Fi signals to Wi-Fi enabled devices (e.g., smart phones) for use in awareness and promotion.

SUMMARY

One embodiment provides a system comprising at least one processor and a storage device storing instructions that when executed by the at least one processor causes the at least one processor to perform operations. The operations include determining one or more zones within a venue based on wireless signals transmitted by one or more wireless sensors. The operations further include, for at least one zone, determining a current state associated with the zone, monitoring the zone, and, in response to detecting a device entering the zone, notifying the device of the current state associated with the zone. Each zone is assigned to a zone owner. A current state associated with a zone is based on a real-time location of a device carried by the zone owner.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to location management systems, and more particularly, a location management system providing zone-based away messages. One embodiment provides a system comprising of at least one processor and a storage device storing instructions that when executed by the at least one processor causes at least one processor to perform operations. The operations include determining one or more zones within a venue based on wireless signals transmitted by one or more wireless sensors. The operations further include, for at least one zone, determining a current state associated with the zone, monitoring the zone, and, in response to detecting a device entering the zone, notifying the device of the current state associated with the zone. Each zone is assigned to a zone owner. A current state associated with a zone is based on a real-time location of a device carried by the zone owner.

In an office setting, people are constantly moving around. An individual may not be physically present in his/her office or cubicle (e.g., gone to lunch, on a coffee break, out of office for the rest of the day, at a co-worker's office/cubicle, etc.) when a colleague visits the office or cubicle. Embodiments of the invention allow the individual to create an "away" message for the office or cubicle to notify colleagues of his/her status when he/she is not physically present in the office or cubicle. The status may further include a current location of the individual where he/she may be reached, or other relevant information.

For expository purposes, the term "venue" as used herein generally denotes a physical space (i.e., a collection of physical coordinates) owned and/or operated by an individual or an entity (e.g., a retail company, a start-up, a law firm, etc.). The term "venue operator" as used herein generally denotes an individual or entity operating a venue. A physical space operated by a venue operator may be occupied by one or more employees of the venue operator. The term "zone" as used herein generally denotes a logical or abstract area within a venue occupied by a particular individual (e.g., an employee's cubicle) or having a particular purpose (e.g., an office department such as the Accounts department, a seating area, a counter, an office, etc.).

The terms "zone owner" and "user" may be used interchangeably in this specification.

Embodiments of the invention allow a venue operator of a venue to create one or more zones within the venue. Embodiments of the invention provide a location management system configured to aggregate location and location-related metadata to build context that may be used for analysis and resulting actions. Embodiments of the invention provide a location management system that may be used for security purposes.

Figure 1:
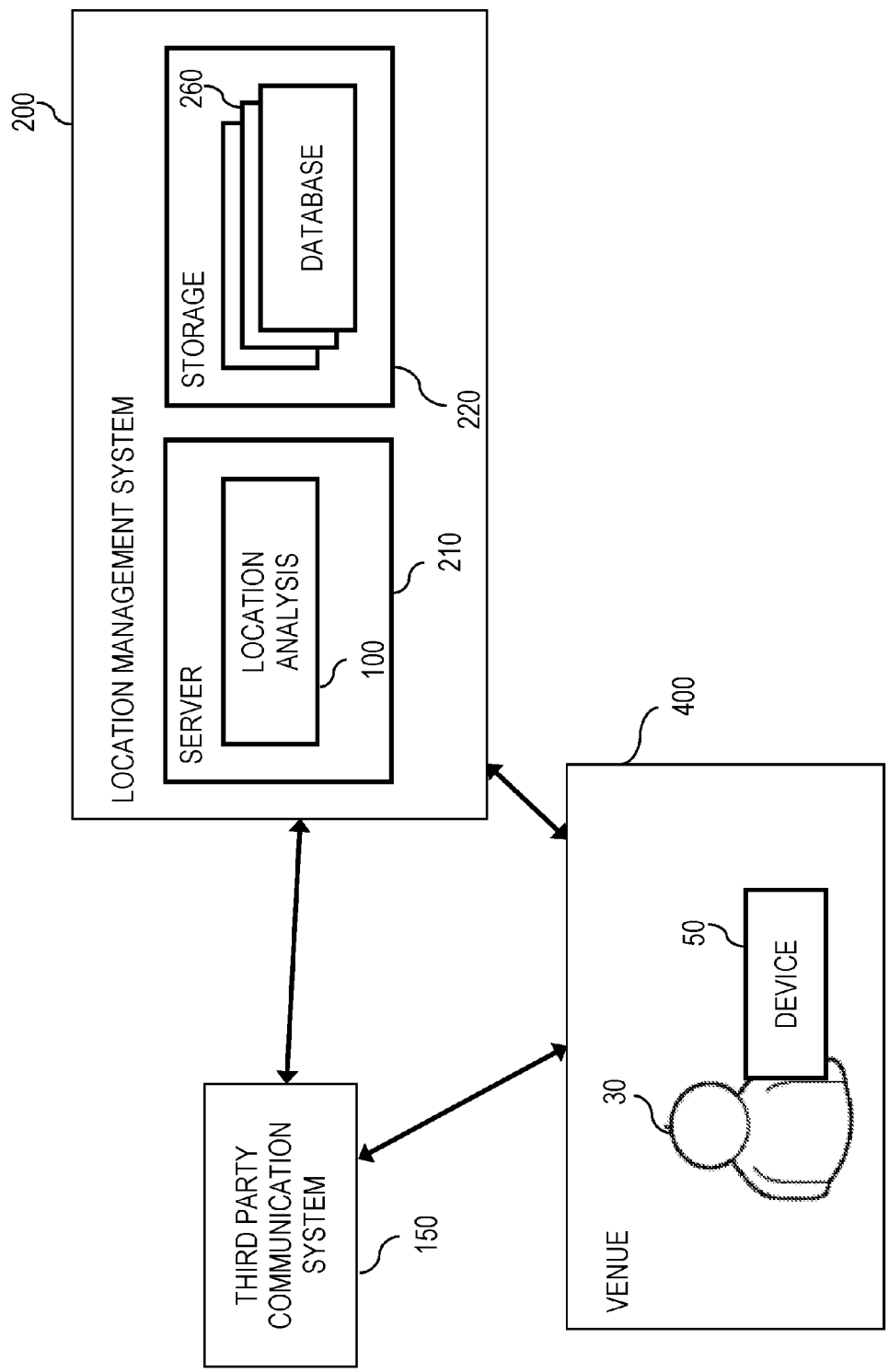
FIG. 1 illustrates an example location management system for a venue, in accordance with an embodiment of the invention.

FIG. 1 illustrates an example location management system 200 for a venue 400, in accordance with an embodiment of the invention. The system 200 comprises one or more server devices 210, and one or more storage devices 220. The storage devices 220 maintain one or more databases 260. As described in detail later herein, one or more application units may execute/operate on the server devices 210, such as a location analysis unit 100 configured to provide zone-based away messages. The system 200 may be implemented at the venue 400 itself or in a cloud computing environment.

A user 30 (e.g., an occupant of the venue 400, such as a business employee) may exchange data with the system 200 via an electronic device 50 carried by the user 30, such as a laptop computer, a tablet, a mobile smartphone, a wearable device (e.g., a smartwatch), etc. For example, a user 30 initiates a communication with the system 200 utilizing a device 50. In one embodiment, a device 50 exchanges data with the system 200 over a connection (e.g., a wireless connection, a wired connection, or a combination of the two).

Figure 3:
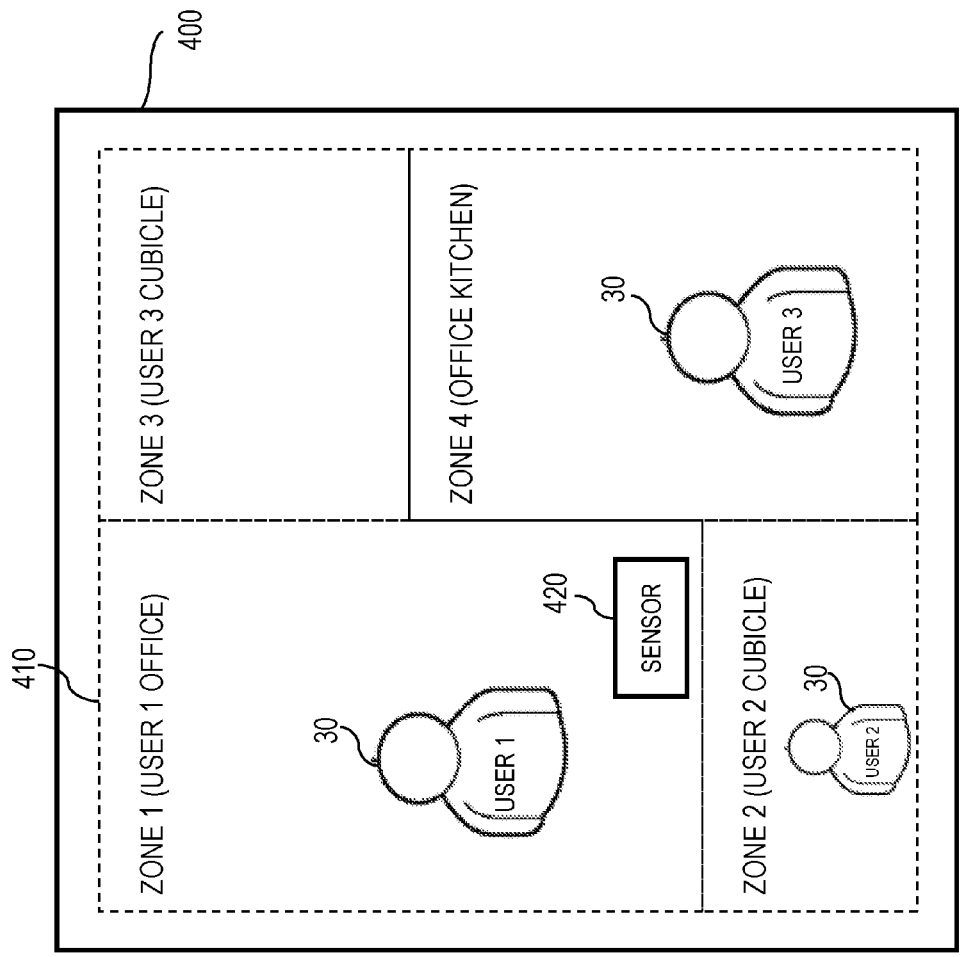
FIG. 3 illustrates an example venue including multiple zones, in accordance with an embodiment of the invention.

Assume the venue 400 is marked into one or more zones 410 (FIG. 3). As described in detail later herein, for a given zone 410 within the venue 400, a device 50 carried by a zone owner assigned to the zone 410 may forward to the system 200 information relating to a current status for the zone 410 (i.e., a current state associated with the zone 410). The information forwarded may include, but is not limited to, at least one of the following: (1) status data identifying a current status of the zone owner (e.g., gone to lunch, on a coffee break, in a meeting, left office for the day, at a co-worker's office/cubicle, etc.), and (2) location data identifying one or more real-time locations of the zone owner captured by the device 50.

In one embodiment, the system 200 may be utilized in conjunction with a third party communication system 150 (e.g., SameTime, Slack, etc.) for forwarding away messages, alerts, and notifications. In one embodiment, the third party communication system 150 is configured to exchange data with the system 200 over a connection (e.g., a wireless connection, a wired connection, or a combination of the two). In one embodiment, the system 200 may be directly integrated with a third party communication system 150.

Figure 2:
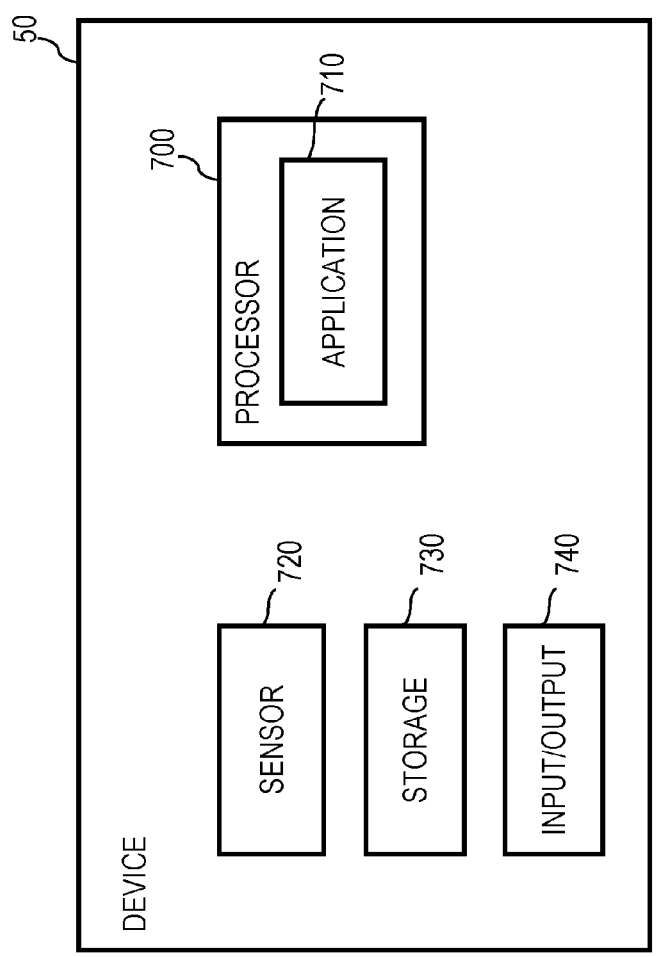
FIG. 2 illustrates an example device in detail, in accordance with an embodiment of the invention.

FIG. 2 illustrates an example device 50 in detail, in accordance with an embodiment of the invention. The device 50 comprises one or more processors 700, and one or more storage devices 730. One or more applications 710 may execute/operate on the processors 700. The applications 710 may include, but are not limited to, at least one of the following: a web browser and/or a mobile application for accessing the system 200 and receiving notifications from the system 200, and a communication application (e.g., a telephony application, a videotelephony application, a Voice over Internet Protocol (VoIP) application, an instant messaging application, a Short Message Service (SMS) application, etc.) associated with a third-party communication system 150 (e.g., SameTime, Slack, etc.).

The device 50 further comprises one or more input/output devices 740, such as a touch screen, a keyboard, a telephone keypad, a microphone, a speaker, a display screen, etc.

The device 50 further comprises one or more sensor devices 720 for capturing information relating to a current status and/or real-time location of a user 30 (e.g., a zone owner) carrying the device 50. For example, the sensor devices 400 may include at least one of the following: an inertial sensor, a Wi-Fi sensor, a Bluetooth sensor, a Global Positioning System (GPS) sensor, etc.

In one embodiment, the device 50 is a Bluetooth and/or Wi-Fi enabled device.

FIG. 3 illustrates an example venue 400 including multiple zones 410, in accordance with an embodiment of the invention. Each venue 400 is marked with specific zones 410. Each zone 410 is assigned to a particular zone owner/user 30. For example, in FIG. 3, the venue 400 includes a first zone 410 referenced as ZONE 1, a second zone 410 referenced as ZONE 2, a third zone 410 referenced as ZONE 3, and a fourth zone 410 referenced as ZONE 4. ZONE 1 is assigned to a first zone owner/user 30 referenced as USER 1 (e.g., ZONE 1 represents an office of USER 1), ZONE 2 may be assigned to USER 2 (e.g., ZONE 2 represents a cubicle of USER 2), ZONE 3 may be assigned to USER 3 (e.g., ZONE 3 represents a cubicle of USER 3), and ZONE 4 may be assigned to a venue operator of the venue 400 (e.g., ZONE 4 represents a common area, such as an office kitchen). As shown in FIG. 3, USER 3 is away from ZONE 3; the system 200 is configured to provide an away message to a device 50 entering or within proximity of ZONE 3 while USER 3 is away (e.g., a device 50 carried by a user 30 not assigned to ZONE 3).

Each zone 410 has one or more wireless location sensors 420 assigned to the zone 410.

In one embodiment, if an open beacon architecture system is in place at the venue 400, sensors 420 assigned to a zone 410 may include Bluetooth low energy (BLE) beacons that are arranged within the zone 410. An application on a device 50 recognizes a beacon assigned to the zone 410 when the device 50 enters or is within proximity of the zone 410; the beacon itself does not detect that the device 50 is within range.

In one embodiment, if a system with triangulation capabilities is in place at the venue 400, sensors 420 assigned to a zone 410 may include Wi-Fi sensors that are installed to provide coverage over the zone 410. When a device 50 enters or is within proximity of the zone 410, an external processing system receives MAC address data for the device 50 from a Wi-Fi sensor assigned to the zone 410, and performs an action that notifies an application on the device 50 that the device 50 has entered or is within the proximity of the zone 410.

Figure 4:
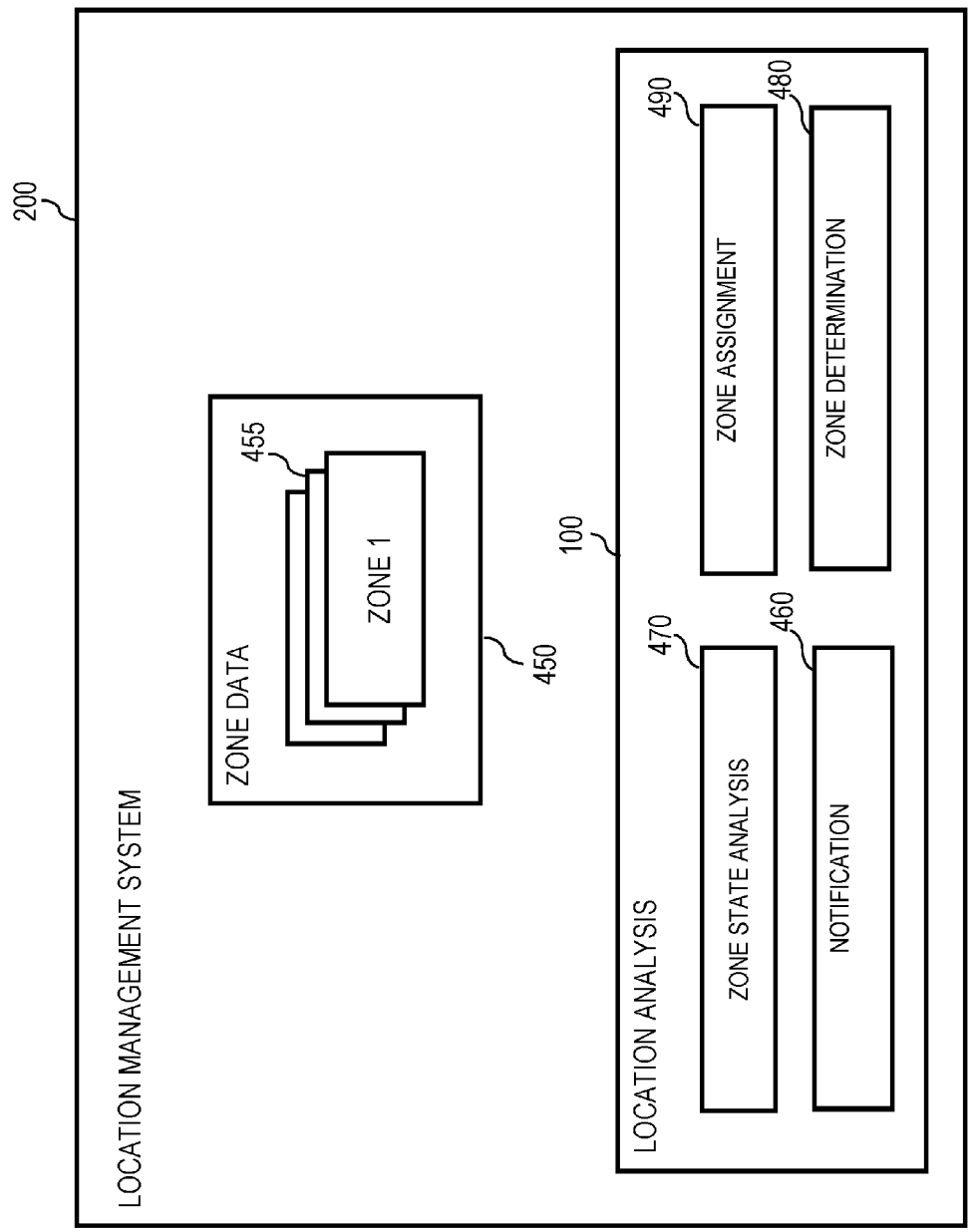
FIG. 4 illustrates the example location management system in detail, in accordance with an embodiment of the invention.

FIG. 4 illustrates the example location management system 200 in detail, in accordance with an embodiment of the invention. As stated above, the storage devices 220 may maintain one or more databases 260. For example, the storage devices 220 may include at least one database 450 including zone data for one or more zones 410 of the venue 400. The zone data comprises at least one data record 455 for each zone 410 of the venue 400. Each data record 455 for each zone 410 comprises, but is not limited to, at least one of the following types of context information: (1) zone owner data identifying a zone owner/user 30 assigned to the zone 410, and (2) zone state data identifying a current status for the zone 410 (i.e., a current state associated with the zone 410).

In one embodiment, zone state data for a zone 410 may include, but is not limited to, at least one of the following: (1) status data identifying a current status of a zone owner/user 30 assigned to the zone 410 (e.g., gone to lunch, on a coffee break, in a meeting, left office for the day, at a co-worker's office/cubicle, etc.), and (2) location data identifying one or more real-time locations of the zone owner, wherein the real-time locations are based on real-time locations of a device 50 carried by the zone owner/user 30.

The location analysis unit 100 comprises a zone determination unit 480 configured to determine one or more zones 410 within the venue 400. As stated above, each zone 410 has one or more wireless location sensors 420 assigned to the zone 410. The zone determination unit 480 is configured to determine a zone 410 based on wireless signals transmitted from one or more sensors 420 assigned to the zone 410.

The location analysis unit 100 further comprises a zone assignment unit 490 configured to set a zone 410 within the venue 400 to a particular zone owner/user 30. In one embodiment, the zone assignment unit 490 is configured to receive zone owner data for a particular zone 410, wherein the zone owner data identifies a zone owner/user 30 assigned to the zone 410. The zone owner data may be provided by a venue operator or by the zone owner/user 30 itself.

The location analysis unit 100 further comprises a zone state analysis unit 470 configured to determine a current status for a zone 410 within the venue 400. A current status for a zone 410 (i.e., a current state associated with the zone 410) is based on a current status and/or real-time location of a zone owner/user 30 assigned to the zone 410. A real-time location of the zone owner/user 30 is determined based on a real-time location of a device 50 carried by the zone owner/user 30.

A zone owner/user 30 may set a current status for his/her assigned zone 410 in response to leaving the zone 410. In one embodiment, the zone state analysis unit 470 is configured to receive an away message from a zone owner/user 30, wherein the away message notifies the system 200 that the zone owner/user 30 is away from his/her assigned zone 410. The away message may be forwarded to the system 200 via a third party communication system 150 (e.g., SameTime, Slack, etc.). The zone state analysis unit 470 updates a current status for the zone 410 based on the away message received from the zone owner/user 30.

In one embodiment, the zone state analysis unit 470 is configured to send an alert to a device 50 carried by a zone owner/user 30 in response to the zone owner/user 30 leaving his/her assigned zone 410. The alert prompts the zone owner/user 30 to reply with a message indicating his/her current status (e.g., gone to lunch, on a coffee break, in a meeting, left office for the day, at a co-worker's office/cubicle, etc.). A current status for the zone 410 is updated based on the reply message received from the zone owner/user 30.

In one embodiment, the system 200 provides suggested away messages that a zone owner/user 30 may select/choose as his/her away message.

In one embodiment, a zone owner/user 30 provides the system 200 with authorization to directly access a real-time location of a device 50 carried by the zone owner/user 30. The real-time location of the device 50 may represent the real-time location of the zone owner/user 30. The zone state analysis unit 470 updates a current status for a zone 410 assigned to the zone owner/user 30 based on the real-time location of the device 50.

The location analysis unit 100 further comprises a notification unit 460 configured to: (1) monitor a zone 410, (2) detect when a visiting device 50 (i.e., a device 50 carried by a user 30 other than a zone owner/user 30 assigned to the zone 410) enters or is within proximity of the zone 410, and (3) notify the visiting device 50 of a current status for the zone 410 (i.e., current status and/or real-time location of the zone owner/user 30). In one embodiment, the visiting device 50 may receive an alert notifying of the current status. The alert may be provided via an application 710 on the visiting device 50 or via push notification.

In one embodiment, the system 200 allows a venue operator and/or a zone owner/user 30 to set one or more customized thresholds. For example, a threshold of how long a visiting device 50 must be in a zone 410 may be set. As another example, a padding/boundary around a zone 410 may be set to determine how far a visiting device 50 needs to be in order to trigger an alert.

In one example implementation, assume the system 200 is utilized in an office context. A venue operator may designate/mark each cubicle within an office as a zone 410. For example, the venue operator may upload a floor plan for the office to the system 200, and mark each cubicle in the floor plan as an individual zone 410. Each cubicle is assigned to a particular employee of the venue operator. An employee may set an away message for his/her cubicle when he/she leaves the cubicle. When a visiting device 50 carried by a user 30 (e.g., a co-worker) arrives at the cubicle when the employee is away, the visiting device 50 is presented with the away message.

In one embodiment, a user 30 may determine online, utilizing a device 50 carried by the user 30 (e.g., via a web browser and/or a mobile application for accessing the system 200), a current status for a zone 410 that he/she intends to visit.

In one embodiment, a zone owner/user 30 may receive an alert from the system 200 when the system 200 detects a visiting device 50 entering or within proximity of a zone 410 assigned to the zone owner/user 30.

Figure 5:
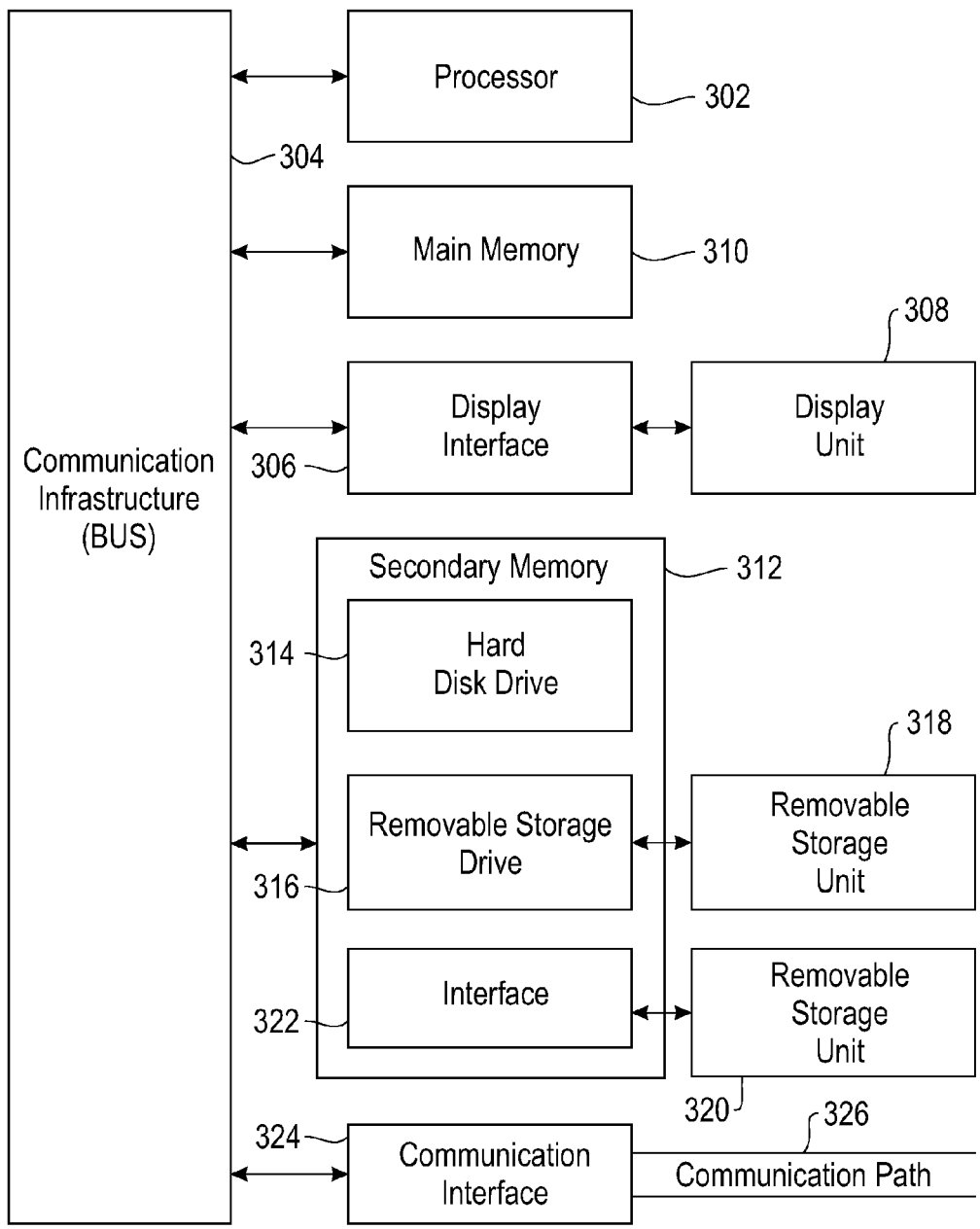
FIG. 5 is a high level block diagram showing an information processing system useful for implementing an embodiment of the present invention.

FIG. 5 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, solid-state storage, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   at least one processor; and
   a storage device storing instructions that when executed by the at least one processor causes the at least one processor to perform operations including:
   determining a zone within a venue based on wireless signals transmitted by at least one wireless sensor assigned to the zone;
   determining a real-time location of a first device carried by a zone owner assigned to the zone;
   determining a current state associated with the zone based on the real-time location of the first device, wherein the current state associated with the zone comprises a real-time location of the zone owner;
   monitoring the zone;
   in response to detecting the first device leaving the zone:
      sending an alert to the first device to prompt the zone owner to select an away message indicative of a status of the zone owner while the zone owner is away from the zone; and
      updating the current state associated with the zone based on the away message; and
   in response to detecting a second device entering or within proximity of the zone while the zone owner is away from the zone:
      notifying the second device of the current state associated with the zone by presenting the away message to the second device; and
      sending an alert to the first device to notify the zone owner that the second device entered or is within proximity of the zone.

* * * * *